United States Patent [19]

Saiki et al.

[11] Patent Number: 4,812,166
[45] Date of Patent: Mar. 14, 1989

[54] PROCESS FOR PRODUCING ULTRAFINE PARTICLES OF METALS, METAL COMPOUNDS AND CERAMICS AND APPARATUS USED THEREFOR

[75] Inventors: Goro Saiki; Jiro Kondo; Koichi Takeda, all of Kawasaki; Mutsuo Maki; Tutomu Ooki, both of Kitakyushu, all of Japan

[73] Assignee: Nippon Steel Corporation, Japan

[21] Appl. No.: 166,942

[22] Filed: Mar. 11, 1988

[30] Foreign Application Priority Data

Mar. 11, 1987 [JP] Japan ................................. 62-53985

[51] Int. Cl.$^4$ ............................................. B22F 9/08
[52] U.S. Cl. ............................ 75/0.5 C; 219/121.59; 219/121.37; 219/121.53; 219/121.48;
[58] Field of Search ............... 75/0.5 C; 219/121 PY, 219/121 PA, 121 PB, 121 PM; 315/111.51

[56] References Cited

U.S. PATENT DOCUMENTS

| | | | |
|---|---|---|---|
| 3,714,390 | 1/1973 | Foex et al. | 219/121 PR |
| 4,105,437 | 8/1978 | Liu | 219/121 PR |
| 4,626,648 | 12/1986 | Browning | 219/121 PY |
| 4,727,236 | 2/1988 | Hull et al. | 219/121 PR |
| 4,731,517 | 3/1988 | Cheney | 219/121 PY |

*Primary Examiner*—Wayland Stallard
*Attorney, Agent, or Firm*—Pollock, Vande Sande & Priddy

[57] ABSTRACT

Ultrafine particles of metals, metallic compounds, and ceramics can be produced by heating a starting material supplied hermetically with a plurality of direct current plasma currents combined at a central axis of a work coil for generating high frequency induction plasma positioned under the direct current plasma generated zone. Apparatuses used therefor are also disclosed.

6 Claims, 3 Drawing Sheets

PROCESS FOR PRODUCING ULTRAFINE PARTICLES OF METALS, METAL COMPOUNDS AND CERAMICS AND APPARATUS USED THEREFOR

BACKGROUND OF THE INVENTION

This invention relates to a process and an apparatus for producing ultrafine particles of metals, metallic compounds and ceramics with high purity and controlled particle shape, particle size and particle size distribution by a plasma method in order to yield ceramic sintered bodies with highly controlled microstructures and constructions.

Ceramic ultrafine particles or powders are used for giving structural, functional or biotechnological ceramic materials (sintered bodies). With recent progress in studies, in order to meet requirements for fine ceramics partly used practically, for example, in order to obtain high physical properties such as high heat resistance, high strength, high toughness, etc., in the case of structural materials such as engine parts in cars, or in order to obtain uniformity in physical properties in the case of functional materials such as chemical sensors, there have been desired to have uniform grain sizes in ceramic sintered bodies in the range of about 0.5 to 5 $\mu$m, to have pores with a uniform size and distributed uniformly in ceramic configuration, or to have no pores depending on use, to have impurities in the crystal grain boundaries as small as possible, or to be controlled to have constant components.

Ceramic raw material powders can be produced by a grinding and classifying method, a wet method with chemical substances, or a gas phase method wherein fine particles are formed by synthesis by a dry method.

According to the grinding and classifying method, there are defects in that impurities are easily mixed, the resulting particles are angular and easily form large spaces irregularly when molded, it is difficult to classify raw material particles with uniform particle size in the range to 0.05 to 1.0 $\mu$m, which range is considered to be preferable in the present ceramic production technique to give crystal particles with most uniform in quality, and dense, small and uniform particle size, and particularly there is obtained a broad particle size distribution.

According to the wet method, in the case of oxide ceramics such as $Al_2O_3$, $SiO_2$, $ZrO_2$, etc., there can be obtained spherical particles with the desired particle size directly, or primary particles having a very small particle size of 0.01 to 0.04 $\mu$m, said primary particles being able to give single particle size secondary particles with almost spherical in shape, and dense and desirable particle size by an improved treating method. In the non-oxide system, for example, $Si_3N_4$ can be obtained by an imide method wherein primary particles are as small as 0.05 $\mu$m or less. These fine primary particles grow by combining fine particles by a sintering treatment to large particles with uniform particle size depending on the sintering temperature and time. But it is inevitable to fuse the particles each other partly. Further, bridging easily takes place at the time of molding, which results in making it impossible to always produce products with high density.

According to the gas phase method, reaction gases previously mixed are introduced into a reaction zone, or reaction gases are directly mixed at the reaction zone. Since ceramic particles formed by synthesis or decomposition reaction have a melting point considerably higher than the temperature of the reaction zone, the growth of particles is difficult and the particle size obtained is about 0.01 $\mu$m, which size is about 1/10 of the desirable particle size of 0.05 to 1.0 $\mu$m. Although secondary particles may grow to some extent by collision of primary particles each other, it is difficult to control desirably the density, particle shape, particle size, and particle size distribution of the secondary particles. Thus, uniform dispersion of the particles at the time of molding is difficult, which results in failing to obtain dense molded products practically.

The gas phase method includes a plasma method, and particularly a hybrid plasma method, which are disclosed, for example, in Japanese Patent Unexamined Publication Nos. 55-32317 and 60-19034. According to these methods, one direct current (dc) arc plasma jet is combined with a high frequency induction plasma. The apparatus disclosed therein comprises a dc arc plasma torch and a high frequency induction coil, the central line of the both being owned jointly as shown in FIG. 5. According to these methods, there is a defect in that a starting material powder cannot be supplied to the high frequency induction plasma effectively.

The present inventors disclosed in Japanese Patent Unexamined Publication No. 60-77114 that spherical SiC having a particle size of 0.05 to 1.0 $\mu$m with almost single particle size was synthesized by a plasma method using a Si compound and a carbon compound as starting materials. More concretely, a Si compound such as $SiH_4$ is decomposed thermally at a temperature higher than the melting point of Si to form liquid particles, followed by reaction with a carbon compound such as $CH_4$ gas at a temperature higher than the melting point of Si to give spherical SiC powder having a particle size of 0.1 to 1.0 $\mu$m.

On the other hand, Japanese Patent Unexamined Publication No. 61-232269 discloses a process for producing B-containing SiC by introducing a carbon-free Si compound, or Si with a carbon-free boron compound or boron, yielding Si and B by reduction, pyrolysis or simple melting, making the temperature lower than the boiling point of Si but higher than the melting point of Si to form B-containing Si liquid spheres, followed by carbonization.

But according to these Japanese Patent Unexamined Publications, there is a problem in that the selection of starting materials is difficult. That is, when hydrogenated silicon such as $SiH_4$ gas is used as a silicon compound, the desired Si liquid sphere can easily be formed by pyrolysis, but the hydrogenated silicon is expensive at present. When a chloride such as $SiCl_4$ is used, Si or B can be obtained by reduction with hydrogen at a high temperature, but very corrosive HCl or $Cl_2$ is produced to deteriorate the apparatus, which results in raising a problem of maintenance of the apparatus. Further, when Si and B powders are used to directly form liquid spheres of (Si +B) by melting, it is difficult to obtain a high purity powder of submicron size, the surface of which is not oxidized, or even if obtained, particles are aggregated undesirably at the time of blowing to form large (Si +B) liquid spheres having a particle size of 1 $\mu$m or more. When vaporzied and passed as Si and B vapors, such aggregation does not take place. But very high temperature and remarkable temperature uniformity are required to vaporize the whole blown Si and B, so that in practice, aggregated particles pass a low-temperature portion without vaporization, a considerably large amount of particles are collected as large particles. This is a problem.

In the case of materials other than Si series materials, for example, Al, Zr, Mo, etc., production of hydrogenated compounds and access to these materials are sometimes very difficult.

SUMMARY OF THE INVENTION

It is an object of this invention to provide a process and an apparatus for producing ultrafine particles of 0.05 to 1.0 μm in particle diameter of metals, metallic compounds or ceramics by a plasma method.

This invention provides a process for producing ultrafine particles of a metal, a metallic compound or a ceramic having an average particle size of 0.05 to 1.0 μm which comprises combining a plurality of direct current plasma currents on a central axis of a work coil for high frequency induction plasma, supplying a metal, a metallic compound or a ceramic as a starting material to the combining portion of the direct current plasma currents while excluding the air, and vaporizing the starting material with heating.

This invention also provides a hybrid plasma generating apparatus comprising a plurality of means for generating direct current plasma currents and a work coil for generating a high frequency induction plasma, said direct current plasma generating means being placed so as to combine the direct current plasma currents on the central axis of the work coil.

This invention further provides an apparatus for producing ultrafine particles of metals, metallic compounds and ceramics comprising a direct current plasma zone and a high frequency plasma zone, said direct current plasma zone having at upper periphery portion thereof a plurality of means for generating direct current plasma currents so as to be combined on the central axis of a work coil for generating a high frequency induction plasma in said high frequency plasma zone, and a hermetic starting material supplying inlet at the center of the top portion of said direct current plasma zone.

DESCRIPTION OF THE PREFERRED EMBODIMENTS

Figure 1:
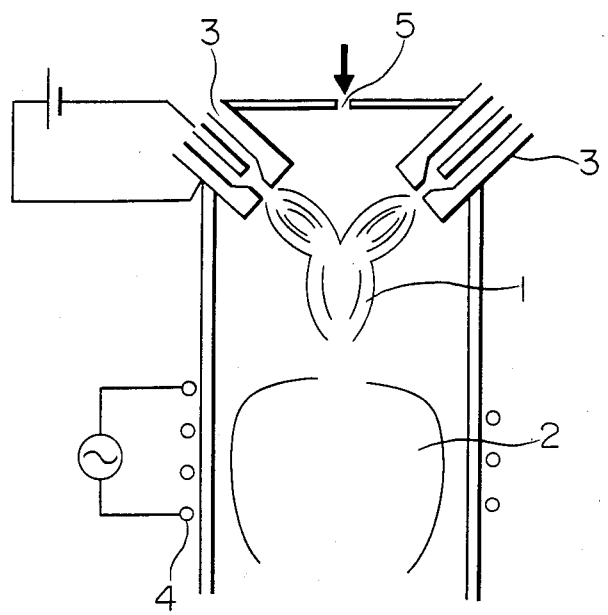
FIG. 1 is a schematic cross-sectional view of one example of the hybrid plasma generating apparatus according to this invention.

The particle size of metals, metallic compounds or ceramics obtained in this invention is 0.05 to 1.0 μm in average.

When the particle size is smaller than 0.05 μm in the production of a sintered body from a metallic compound powder or ceramic powder, secondary particles are formed roughly, due to the action of surface charge of the particles or the action of liquid attached to the particle surfaces, and the green density is lowered at the time of molding to distribute large and small pores in uncontrolled state in the green body. On the other hand, when the particle size is larger than 1.0 μm, it becomes difficult to densely sintered $Si_3N_4$, SiC and the like substances which are usually difficult to be sintered.

Further, according to conventional plasma methods, even if the average particle size is in the range of 0.05 to 1.0 μm, when the particle size distribution is wide, rough secondary particles are easily formed, and there is a tendency to grow abnormally to form undesirably large particles due to strong reactivity of fine particles at the time of sintering a green body. Such a problem is also solved by this invention.

According to the recent particle surface treating technique, or particle surface charge controlling technique in a powder-liquid system, or dispersing technique in protective colloid and the like, the particle size in the range of 0.05 to 1.0 μm with a very narrow single particle size distribution can provide a green body with uniform quality and high density, and a sintered body of remarkably dense with small and uniformly controlled grain sizes. When the particle shape is needle-like or angular, there is a tendency to roughly aggregate or to bridge so as to lose uniform quality of green body according to conventional plasma methods. Therefore, it is preferable to use spherical or cubic particles for molding and sintering. But, such a problem is solved by this invention.

This invention is characterized by charging the supplied starting material to a high-temperature gas flow effectively, leading the supplied starting material to the central portion of high frequency induction plasma effectively, and making the residence time of the supplied starting material at the high-temperature portion long. Since this invention makes it possible to melt and vaporize the whole supplied starting material uniformly, it becomes possible to select the starting material among metals, metallic compounds and ceramics depending on purposes and other conditions. Therefore, the problem of difficulty in selecting the starting material is solved. Further, it also becomes possible to produce various ultrafine particles of metals, metallic compounds and ceramics other than Si series ones.

Examples of the products obtained by this invention are $ZrO_2$, $TiO_2$, $Al_2O_3$, MgO, $CeO_2$, SnO, ZnO, $SiO_2$, $ZrB_2$, $TiB_2$, $NbB_2$, MoB, $Mg_2Si$, $Y_5Si$, $TaB_2$, WB, $VB_2$, CrB, $HfB_2$, $CeSi_2$, $ThSi_2$, $U_3Si_2$, $MoSi_2$, $VSi_2$, $TaSi_2$, $WSi_2$, $TiSi_2$, $ZrSi_2$, $NbSi_2$, $HfSi_2$, $TaSi_2$, AlN, BN, TiN, $Si_3N_4$, ZrN, VN, NbN, TaN, $Cr_2N$, HfN, TiC, $B_4C$, TaC, WC, $Cr_3C_2$, ZrC, NbC, VC, MoC, HfC, $TiS_2$, CrS, MnS, $CoS_2$, TiAl, $AlMo_3$, etc., alone or as a mixture thereof, and metals such as B, Si, Al, Ti, Cr, Mn, Fe, Co, Ni, Cu, Zn, Y, Zr, Mo, Sn, Ta, W, Hf, V, Nb, Pt, etc., alone or as a mixture thereof.

The starting material can be used in the form of either powder, liquid or gas, or in the shape of wire, rod-like material, or the like. Further, it is possible to use particles having a slightly wide particle size distribution.

This invention is illustrated more in detail referring to the drawings.

FIG. 1 is a schematic cross-sectional view of one example of the hybrid plasma generating apparatus according to this invention. In FIG. 1, a plurality of dc plasmas 1 and a high frequency induction plasma 2 are combined to form a hybrid plasma. A plurality of dc plasma guns 3 are positioned on the periphery of the top portion of the apparatus and a work coil 4 for high frequency plasma is positioned under the dc plasma guns so that the central axis of the periphery for positioning the dc plasma guns coincides with the central axis of the work coil 4. In this case, it is not always necessary to position the dc plasma guns on the periphery of the top portion. The important thing is to position the dc plasma guns so as to direct dc plasma currents toward the center of the high frequency induction plasma, and the dc plasma and high frequency plasma are connected without separation. More in detail, it is preferable to direct each dc plasma at an angle of 45° or less with regard to the central axis of the work coil 4. When the angle between the central axis and the dc plasma becomes smaller, there is a tendency to undesirably increase the speed of the dc plasma so as not to melt the starting material powder sufficiently particularly when the starting material powder has a higher melting point. In such a case, suitable conditions can be obtained by, for example, making the angle larger, raising the power higher, and the like.

A starting material supplying hole 5 is provided at the top portion of the apparatus above the dc plasma guns 3 and at the central axis of the work coil 4.

A starting material of metal, metallic compound or ceramic is charged from this supplying hole 5. A plurality of dc plasma flames are jetted from the dc plasma guns toward the center of the periphery on which the dc plasma guns are positioned, and are combined on their way to form a plasma flame or a high-temperature gas current toward the center of the high frequency plasma. Since the plurality of dc plasma guns are positioned at outer portion in the apparatus as shown in FIG. 1, the starting material supplied from the supplying hole 5 is inhaled by the plasma flame effectively at the central portion and jetted downward toward the center of the high frequency plasma. Since the combined dc plasma flames have a speed along the central axis of the high frequency induction plasma and the high-temperature gas current is highly viscous, the starting material inhaled in the combined flames is not scattered and passes through the central portion of the high frequency induction plasma to be melted or vaporized with heating.

In order to melt and vaporize a solid, there are known and used a method of irradiating with a laser, or ion or electron beams, a method of collecting heat rays radiated from a high-temperature substance such as a solar furnace, image furnace, infrared oven, etc. to one point and irradiating it, a method of using thermal plasma gas, or a method of using heat transfer/radiation from a heating medium or a furnace wall, and the like.

Among these methods, the use of thermal plasma is preferred since the ultra-high temperature can be obtained in relatively large amount with ease and the control is easy, so that the thermal plasma is widely used for melting low-melting substances such as ceramics and high-melting substances and used in a melt cutter, a flame spray apparatus, and the like.

The present inventors have noticed the convenience and largeness of productivity of the thermal plasma, and tried to use the thermal plasma for melting and vaporizing metals, metallic compounds and ceramics. The structures of apparatus used therefor are shown in FIGS. 3 to 5.

Figure 3:
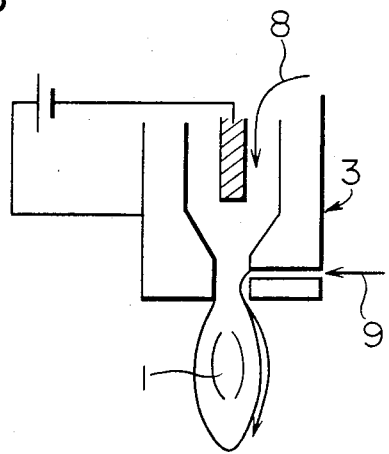
FIG. 3 is a schematic cross-sectional view of a direct current plasma generating apparatus.

In the case of dc plasma alone as shown in FIG. 3, which is a so-called flame spray apparatus, melting is possible but vaporization of the whole starting material is difficult. In FIG. 3, numerals 1 and 3 are the same as explained in FIG. 1, numeral 8 denotes a plasma gas and numeral 9 denotes a starting material powder.

Figure 4:
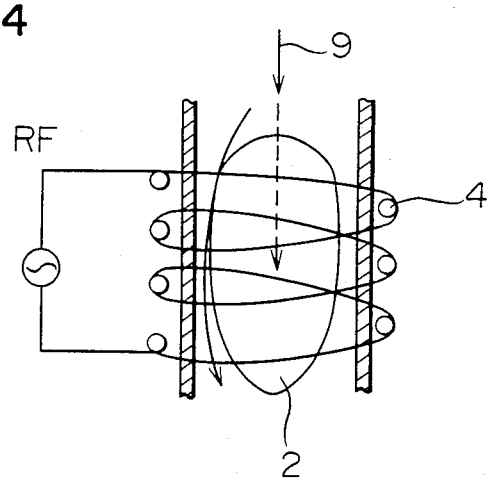
FIG. 4 is a schematic cross-sectional view of a high frequency induction plasma generating apparatus.

In the case of high frequency induction plasma alone as shown in FIG. 4, there are many defects in that complete vaporization of the starting material is difficult, the plasma is unstable and easily disappears when the starting material is added thereto, it is difficult to charge the whole supplied starting material powder into the central portion without dispersion outward, some of the powder adheres to the wall, and the like. In FIG. 4, numeral 2 denotes a high frequency induction plasma, numeral 4 denotes a work coil for high frequency induction plasma, and numeral 9 denotes a starting material powder.

Figure 5:
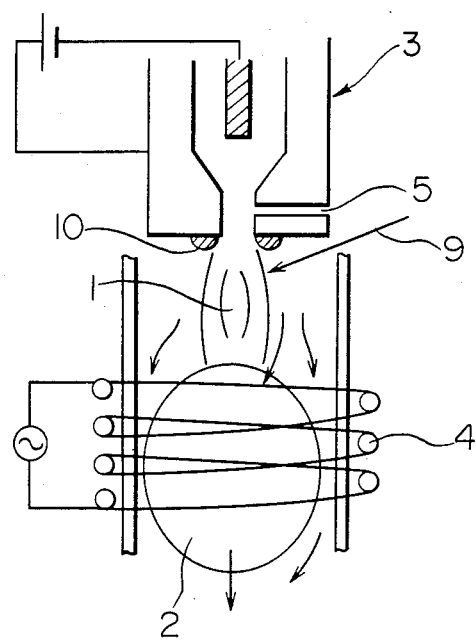
FIG. 5 is a schematic cross-sectional view of a hybrid plasma generating apparatus comprising one direct current plasma generating means and one high frequency induction plasma generating means.

In the case of a hybrid plasma consisting of one dc plasma and one high frequency induction plasma as shown in FIG. 5, when a starting material powder 9 is blown into a dc plasma 1, since entrance of the powder into the dc plasma is difficult due to high viscosity of the dc plasma (high-temperature gas current), the powder does not pass through a high frequency plasma flame but pass through an outer portion thereof to become non-vaporized molten body with a large particle size. Alternatively, when the powder is blown from an inlet 5, there is a fear of blocking off the inlet. Even if not blocked off, there are many disadvantages in that build up 10 of molten metal is formed around an outlet for the dc plasma 1 which results in making the operation unstable, some powder passes around the dc plasma and enters into a high frequency plasma 2, and large particles having a particle size of 10 to 100 μm seemed to be derived from non-vaporized powder are recovered. Further, when a part of the starting material powder enters into the center of dc plasma, it is instantly raised to the high temperature in a narrow cross-sectional area, so that the speed of the powder or molten metal sphere becomes too fast due to the remarkably fast gas flow rate, which results in making some of the powder pass through the high frequency plasma flame in a non-vaporized state.

To sum up, when the apparatus as shown in FIG. 5 is used, the starting material powder cannot be supplied to the high frequency plasma effectively. This seems to be caused by the high viscosity of the high temperature gas. That is, the high frequency plasma flame itself has a high viscosity and makes it difficult to take the starting material powder into the inner portion of the plasma flame. In order to solve this problem, there have been made many attempts to analyze the interior gas flows, to improve starting material introducing positions, to adjust the amounts of various gases to be introduced, for supplying the starting material to the interior of the high frequency plasma as effective as possible.

But the above-mentioned methods are insufficient to solve the problem. That is, when the kind of starting material, the introducing amount of starting material and the plasma power are changed, the interior flows are changed and proper starting material introducing positions and various introduced gas amounts are also changed. Consequently, it is impossible to carry out sufficient analysis considering various cases, and thus trial and error is to be employed.

In contrast, when a plurality of the dc plasma guns are positioned so as to combine the dc plasma currents as shown in FIG. 1 and the starting material is passed through the center of the combined dc plasma currents, the starting material is sealed by the highly viscous dc plasma flame to move along the central axis as it is and forced to be supplied to the high frequency plasma. According to the process of this invention, even if reaction conditions are changed slightly, the starting material is always supplied to the high frequency plasma efficiently. As a result, the whole amount of the starting material can be recovered as a product having a particle size of 0.05 to 1.0 μm, while the operation can be carried out stably for a long period of time.

According to the process of this invention, there can be obtained the following advantages.

(1) The starting material is sucked into the center of a plurality of plasma flames easily.

(2) The gas flow rate of a plurality of directions, preferably three-direction or more, combined plasma flames is not so fast, the speed of sucked starting material powder (e.g. metal powder) is slow and vaporized sufficiently.

(3) The whole amount of the starting material passes through the center portion of the high frequency plasma.

(4) The whole amount of the starting material is vaporized.

(5) There is no adhesion of the starting material on the wall of high frequency plasma tube.

(6) The high frequency plasma is stable without making its flame disappear.

(7) It is possible to melt and vaporize a large amount of starting material powder.

As explained above, the hybrid plasma generating apparatus having the starting material supplying hole at the center of the top portion of the apparatus as shown in FIG. 1 has an ability of uniformly melt and vaporize the whole starting material supplied.

When a metal is used as the starting material in the hybrid plasma generating apparatus, it is preferable to use either one of an inert gas such as argon (Ar) or hydrogen gas or a mixture thereof.

The use of hydrogen gas gives the following advantages, that is, (i) oxygen and the like adhered to surfaces of starting material particles can be removed and the starting material can be activated, (ii) heat output of plasma can be raised, since hydrogen gas (H$_2$) is a two-atom molecule, and (iii) thus a high temperature can be obtained easily and a metal can be reduced, for example, by removing chlorine from a metal in the case of a metal chloride.

When metallic compounds or ceramics are used as the starting material, it is necessary to select starting materials considering the chemical reactions of the desired final product in the plasma flame or high-temperature gas currents or physical changes.

This invention is illustrated by way of the following Examples, in which all percents are by weight unless otherwise specified.

EXAMPLE 1

Figure 2:
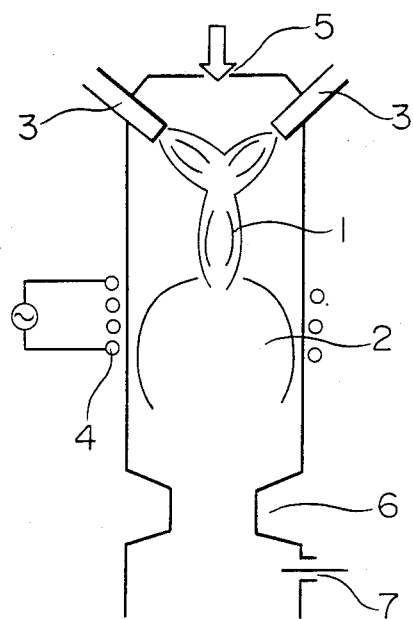
FIG. 2 is a schematic cross-sectional view of another example of the hybrid plasma generating apparatus according to this invention.

The apparatus as shown in FIG. 2 was used. In FIG. 2, hybrid plasma is formed by combining three dc plasma currents 1 generated from dc plasma guns 3 and a high frequency plasma 2 generated by a work coil 4. A starting material supplying hole 5 is formed at the top of the apparatus and a starting material is supplied while excluding the air. There is a narrow portion (neck portion) 6 under the high frequency plasma generating portion. Under the narrow portion, a reactive gas inlet 7 is provided.

Using the above-mentioned apparatus, the operation was carried out under the following conditions.

| | | |
|---|---|---|
| DC plasma output | 15 KW × 3 | (generally 10–30 KW × n) |
| DC plasma gas (Ar) | 15 l/min × 3 | (generally 10–20 l/m × n) |
| Sheath gas (Ar) | 50 l/min | |
| High frequency plasma output | 60 KW | (generally 50–200 KW) |
| Inner diameter of hybrid reactor | 75 mm | (±20 mm) |
| Inner diameter of neck portion | 50 mm | (±20 mm) |
| Inner diameter of reactive gas inlet portion | 80 mm | (±20 mm) |

(Note) "n" means the number of dc plasma guns.

To this reactor, Si powder having a particle size of 100 μm to 44 μm and containing 1.43% of B uniformly was supplied from the supplying hole 5 at a rate of 4.2 g/min (generally 3–100 g/min being possible). The starting material powder dropped along the central axis of the dc plasma and the high frequency plasma and subjected to melting and vaporization. The temperature of the gas current at the front portion of the reactive gas inlet 7 was 1600° to 2000° C.

From the reactive gas inlet 7, a hydrocarbon gas such as CH$_4$ gas was supplied at a flow rate of 3.7 l/min (in principle about, stoichiometrical amount) to synthesize gray powder. The resulting powder was recovered by a bag filter provided in the later stage. The obtained powder had a particle size of 0.3 to 0.5 μm and a shape of sphere or cubic particles. The powder was β-SiC containing about 1% of B. Further, 0.5% of free carbon was contained in the resulting powder due to the addition of CH$_4$ gas slightly in excess with respect to the stoichiometric amount of Si charged. By controlling the amount of CH$_4$ gas, the amount of free carbon can be changed freely or free Si without free carbon can be produced.

In the apparatus shown in FIG. 2, the portion above the reactive gas inlet 7 is narrowed in order to prevent a back current toward the upper stream portion due to explosively rapid expansion of the charged reactive gas. When the back current takes place, a reaction between insufficiently grown particles or non-condensed gases takes place, which results in mixing with fine, uncontrolled shape of particles.

The produced powder collected by the bag filter was uniaxial pressed at 100 Kg/cm$^2$, followed by cold isostatic press (CIP) molding at 7000 Kg/cm$^2$. The green body had a density of 67% of theoretical density (TD). The green body was sintered at 2150° C. in an Ar atmosphere for 30 minutes to give a SiC sinter body having a density or 99% or more of the theoretical density.

When β-SiC powder (particle size 0.3 μm) available commercially mixed with 1% of B$_4$C and 1% of C was CIP molded (green density: 62% of theoretical density) and sintered in the same manner as mentioned above. The resulting sintered body had a density of 97% of the theoretical density.

This shows that the product obtained by the process of this invention is superior to commercially available powder in molding properties and sintering properties.

EXAMPLE 2

The process of Example 1 was repeated except for not introducing the reactive gas CH$_4$. As a result, a brown spherical Si powder having a particle size of 0.3 to 0.5 μm was obtained.

EXAMPLE 3

The process of Example 1 was repeated except that high purity Al powder was supplied at a rate of 3.0 g/min in place of the Si powder containing B, the temperature of gas stream before the reactive gas inlet was controlled at 1500 to 1900° C., and $NH_3$ or $N_2$ gas was introduced at a rate of 5 to 10 μl/min to react with liquid sphere of Al. It is possible to feed $NH_3$ or $N_2$ several to ten times as much as the stoichiometrical amount. While AlN powder having a particle size of 0.1 to 0.3 μm was collected in a bag filter.

As mentioned above, according to this invention, there can be produced easily ceramic starting material powder, which is necessary for producing fine ceramic sintered bodies with high quality, having high purity, a particle size of 0.05 to 1.0 μm, a narrow particle size distribution, and a shape of sphere, cubic particles or similar shapes. Further, the difficulty in selecting starting materials is overcome by this invention.

What is claimed is:

1. A process for producing ultrafine particles of a metal, a metallic compound or a ceramic having an average particle size of 0.05 to 1.0 μm which comprises
   combining a plurality of direct current plasma currents on a central axis of a work coil for generating high frequency induction plasma,
   supplying a metal, a metallic compound or a ceramic as a starting material to the combining portion of the direct current plasma currents while excluding the air,
   vaporizing the starting material with heating,
   leading the vaporized material to a temperature region having a temperature equal to or higher than the melting point and lower than the boiling point of the starting material to conduct condensation growth of liquid sphere of the starting material, followed by cooling.

2. A process for producing ultrafine particles of a metal, a metallic compound or a ceramic having an average particle size of 0.05 to 1.0 μm which comprises
   combining a plurality of direct current plasma currents on a central axis of a work coil for high frequency induction plasma,
   supplying a metal, a metallic compound or a ceramic as a starting material to the combining portion of the direct current plasma currents while excluding the air,
   vaporizing the starting material with heating,
   leading the vaporized material to a temperature region having a temperature equal to or higher than the melting point and lower than the boiling point of the starting material to conduct condensation growth of liquid sphere of the starting material, and
   contacting the liquid sphere with a reactive gas to carry out the reaction therewith.

3. A process according to claim 2, wherein the reactive gas is a hydrocarbon or $NH_3$ or $N_2$.

4. A hybrid plasma generating apparatus comprising a plurality of means for generating direct current plasma currents and a work coil for generating a high frequency induction plasma, said direct current plasma generating means being placed so as to combine the direct current plasma currents on the central axis of the work coil.

5. An apparatus for producing ultrafine particles of metals, metallic compounds and ceramics comprising a direct current plasma zone and a high frequency plasma zone, said direct current plasma zone having at upper periphery portion thereof a plurality of means for generating direct current plasma currents so as to be combined on the central axis of a work coil for generating a high frequency induction plasma in said high frequency plasma zone, and a hermetic starting material supplying inlet at the center of the top portion of said direct current plasma zone.

6. An apparatus for producing ultrafine particles of metals, metallic compounds and ceramics comprising a direct current plasma zone, a high frequency plasma zone formed under the direct current plasma zone, and a reaction zone including a reactive gas inlet under the high frequency plasma zone via a narrow portion therebetween, said direct current plasma zone having at upper periphery portion thereof a plurality of means for generating direct current plasma currents so as to be combined on the central axis of a work coil for generating a high frequency induction plasma in said high frequency plasma zone, and a hermetic starting material supplying inlet at the center of the top portion of said direct current plasma zone.

* * * * *